United States Patent [19]

Haseltine et al.

[11] Patent Number: 5,004,331
[45] Date of Patent: Apr. 2, 1991

[54] CATADIOPTRIC PROJECTOR, CATADIOPTRIC PROJECTION SYSTEM AND PROCESS

[75] Inventors: Eric C. Haseltine, Manhattan Beach; Helene H. Jones, Culver City, both of Calif.

[73] Assignee: Hughes Aircraft Company, Los Angeles, Calif.

[21] Appl. No.: 347,111

[22] Filed: May 3, 1989

[51] Int. Cl.$^5$ .................. G02B 17/00; G02B 5/10; G02B 27/14
[52] U.S. Cl. .................. 350/443; 350/442; 350/505; 350/619; 350/174
[58] Field of Search ............ 350/503, 504, 505, 415, 350/442, 443, 620, 320, 174, 171, 619; 353/48, 79, 94, 99

[56] References Cited

U.S. PATENT DOCUMENTS

| | | | |
|---|---|---|---|
| 4,167,311 | 9/1979 | Pund | 353/99 |
| 4,834,515 | 5/1989 | Mencado | 350/442 |
| 4,861,148 | 8/1989 | Sato et al. | 350/620 |

OTHER PUBLICATIONS

*Optical Spectra*, Sep./Oct., 1969, pp. 58–63, "Visual Space Flight Simulators", by Joseph A. LaRussa.

Primary Examiner—Bruce Y. Arnold
Assistant Examiner—James Phan

[57] ABSTRACT

Catadioptric area-of-interest display projectors produce displays having resolution of substantially less than 10 arc minutes per line over a wide field of view. Such projectors include an external entrance pupil for receiving images of substantially collimated light, and optics for conveying such light onto and through an opening in the surface of an aspheric mirror, and then through an opening in a spherical mirror so that light emerging from the opening in the spherical mirror is displayed on a curved screen surface with such high resolution.

A projector system includes this projector and a mirror for steering collimated light from the entrance pupil of the projector into the projector optics. This system, when placed in a flight simulator at the periphery of a flight simulator dome for projection of such light images onto the inner curved surface of the dome, provides high resolution images to viewers located at the center of the dome.

10 Claims, 5 Drawing Sheets

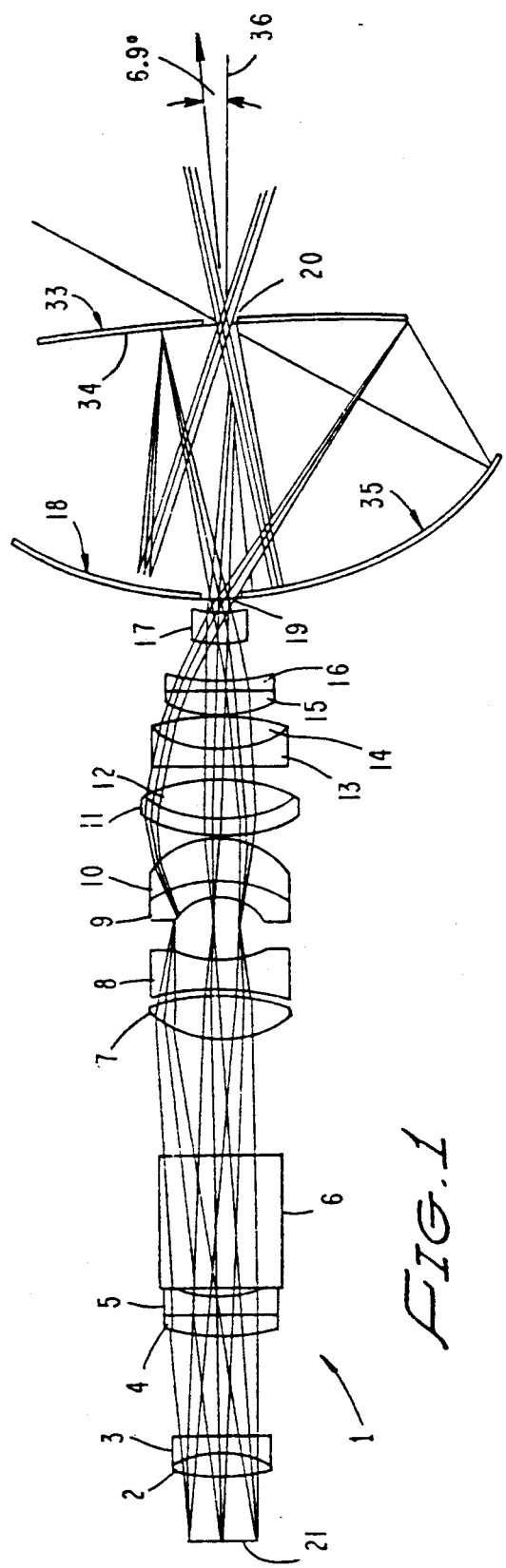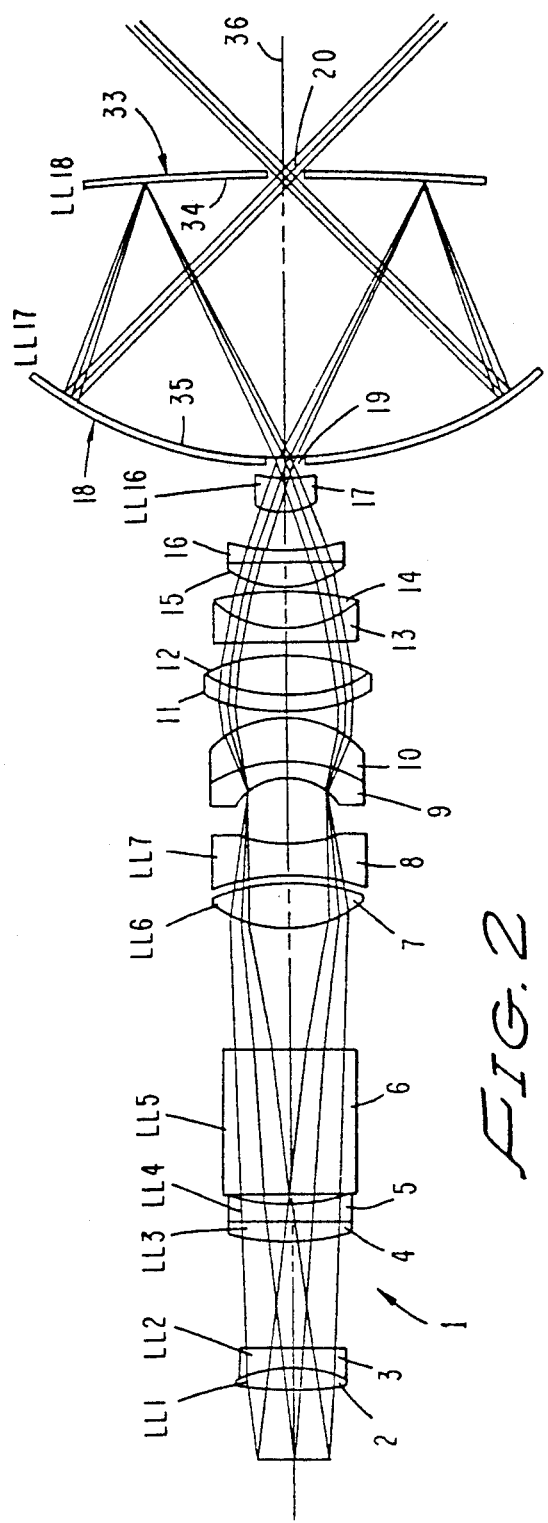

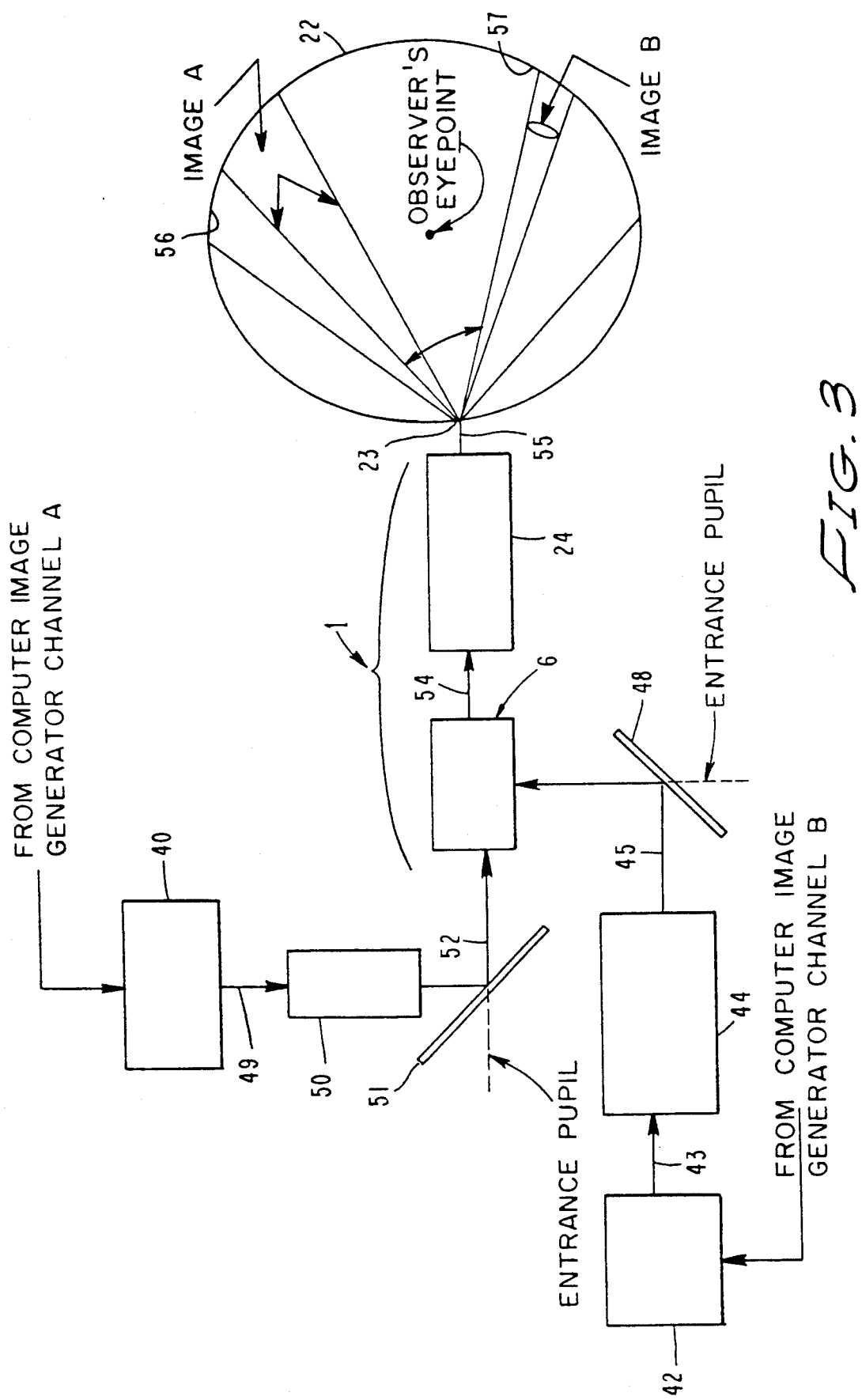

CATADIOPTRIC PROJECTOR, CATADIOPTRIC PROJECTION SYSTEM AND PROCESS

BACKGROUND OF THE INVENTION

1. Field of the Invention

This invention relates to a catadioptric projector for a projection system and to a process for forming catadioptric area-of-interest displays.

2. Description of Related Art

Until now, area-of-interest display systems commonly required placement of projectors inside a dome that forms part of a flight simulator. Placed inside such domes, the projectors either obstruct the field of view or require the addition of high-performance, high-cost, focus and zoom assemblies. Some systems of this kind use multiple projectors with exit pupils positioned in different locations below the operator's field of view. However, multiple, separate exit pupils inside such domes require costly focus mechanisms and cannot be used with projection screen materials that are high gain because of the extreme variations in the angle of incidence at the dome surface. Thus, current area-of-interest displays either obstruct the pilot's field of view or are costly and dim and low in contrast.

SUMMARY OF THE INVENTION

This invention relates to a catadioptric area-of-interest display projector that includes means for producing displays having resolution of substantially less than 10 arc minutes per line, preferably about 5 arc minutes per line or less, and more preferably less than one arc minute per line resolution over a wide field of view, preferably at least about ±56°. These projectors comprise an external entrance pupil as means for receiving beams of substantially collimated light. Following the entrance pupil are refractive optics which are the means for imaging the entrance pupil onto an opening in the surface of an aspheric mirror. The aspheric mirror is coupled with a spherical mirror, and the two mirrors are the means of imaging the pupil in the opening of the aspheric mirror onto an opening in the spherical mirror which is the exit pupil of the projector. The two mirrors are linked with the refractive optics to provide the means for imaging objects at infinity onto the surface of a dome.

The projector provides the means for imaging substantially collimated light onto a dome surface and simultaneously reimaging the external entrance pupil onto an opening in an aspheric mirror and then onto an opening in a spherical mirror. The means for accomplishing these functions comprise a refractive optical objective linked with an appropriately located external entrance pupil, a refractive relay linked with the objective and a reflective relay linked with the refractive relay.

In preferred embodiments, the optical objective comprises six elements in three groups, namely an air-spaced doublet consisting of a bi-convex/concave-plano pair; a meniscus-shaped cemented doublet having equal outer radii to provide color correction; and an air-spaced doublet consisting of a bi-convex/bi-concave pair which acts as a field lens.

The refractive relay, in preferred embodiments, comprises four cemented doublets and a singlet, namely a negative-power meniscus doublet having a strongly concave front surface, followed by a positive bi-convex doublet, followed by a positive plano-convex doublet, followed by a positive meniscus doublet, followed by a positive miniscus singlet.

In preferred embodiments, the entrance pupil is located in front of the first surface of the objective. Preferably, the entrance pupil is located about 1.85 inches in front of this first surface, more generally at the location of the waist of a laser beam, such as a laser beam waist generated by a relay telescope preceding the projector.

In preferred embodiments, the refractive elements of the optical objective and refractive relay form a rotationally symmetric coaxial system. In preferred embodiments, the aspheric and spherical mirrors are tilted to deviate the line of sight from the optical axis of the projector. The spherical mirror is preferably tilted by about 3.45° with respect to the optical axis of the refractive part of the system in the y-z plane so that the line of sight, after reflection by the spherical mirror, is deviated upwardly from the optical axis of the system by a total of about 6.9°. The aspheric mirror is also tilted, in preferred embodiments, by 6.9° with respect to the optical axis of the projector in the y-z plane for the same reason. The amount of deviation in the line of sight from the optical axis of the projector is such that light emerging from the exit pupil of the projector is deflected sufficiently so that a viewer looking directly at the opening in the spheric mirror cannot see light passing through the exit opening.

In preferred embodiments, the catadioptric area-of-interest display projector system includes the new projector and means for steering collimated light beams from the entrance pupil into the projector. The steering system operates in response to signals which may be generated by head and eye movements of the viewer in such a way that an image projected by the catadioptric projector onto the dome surface follows the viewer's line of sight. Such signals may also be electronically generated independently of the viewer, so as to, for example, display moving targets on the dome surface. Preferably, this steering method is a servo-driven, two-axis, gimballed mirror at the entrance pupil of the projector that steers area-of-interest images from a varying field of view into the projector optics in response to such signals. Area-of-interest images can also be directed by target-related geometry commands, so that the catadioptric area-of-interest projector can also function as a high resolution target projector.

The projector system can be used to display a variety of different image sources, such as raster-scanned laser displays and light-valve projector displays. By using relay telescopes having different magnifications to illuminate the entrance pupil of the projector, the instantaneous field of view of projected imagery can vary between 1° and 112°. Input images to the projector can be fixed, or by means of the servo-driven, gimballed steering mirror, slewed within a field of view in response to such signals. In preferred embodiments, the optical objective also includes a beam-combiner means for simultaneously transmitting a plurality of images through the catadioptric projector.

In preferred embodiments, the projector can receive and project a plurality of light images from a plurality of input channels. These channels can have different characteristics for image source, relay telescope, magnification and steering mirror performance. Thus, one input channel can display a larger field of view than another input channel. In general, the number and nature of the input channels can be sufficient to provide displays which match the acuity and field of view of human vision.

In preferred embodiments, the projector system has a circular output field of view of ±56°, or 112° in total. Thus, in preferred embodiments, where the projector system directs light from the periphery of a dome screen onto the inner surface of the dome, two catadioptric projectors, located on opposite sides of, and outside the dome, can project images over substantially the entire inner surface of the dome that is visible to a person located at the center of the dome.

BRIEF DESCRIPTION OF THE DRAWINGS

FIG. 1 is a side elevation view of a preferred embodiment of a catadioptric projector showing ray traces for light passing through this projector embodiment;

FIG. 2 shows a top plan view of the projector embodiment shown in FIG. 1;

FIG. 3 shows a schematic, block diagram illustrating a preferred embodiment of the projector system of the invention;

DESCRIPTION OF THE PREFERRED EMBODIMENT

Figure 4:
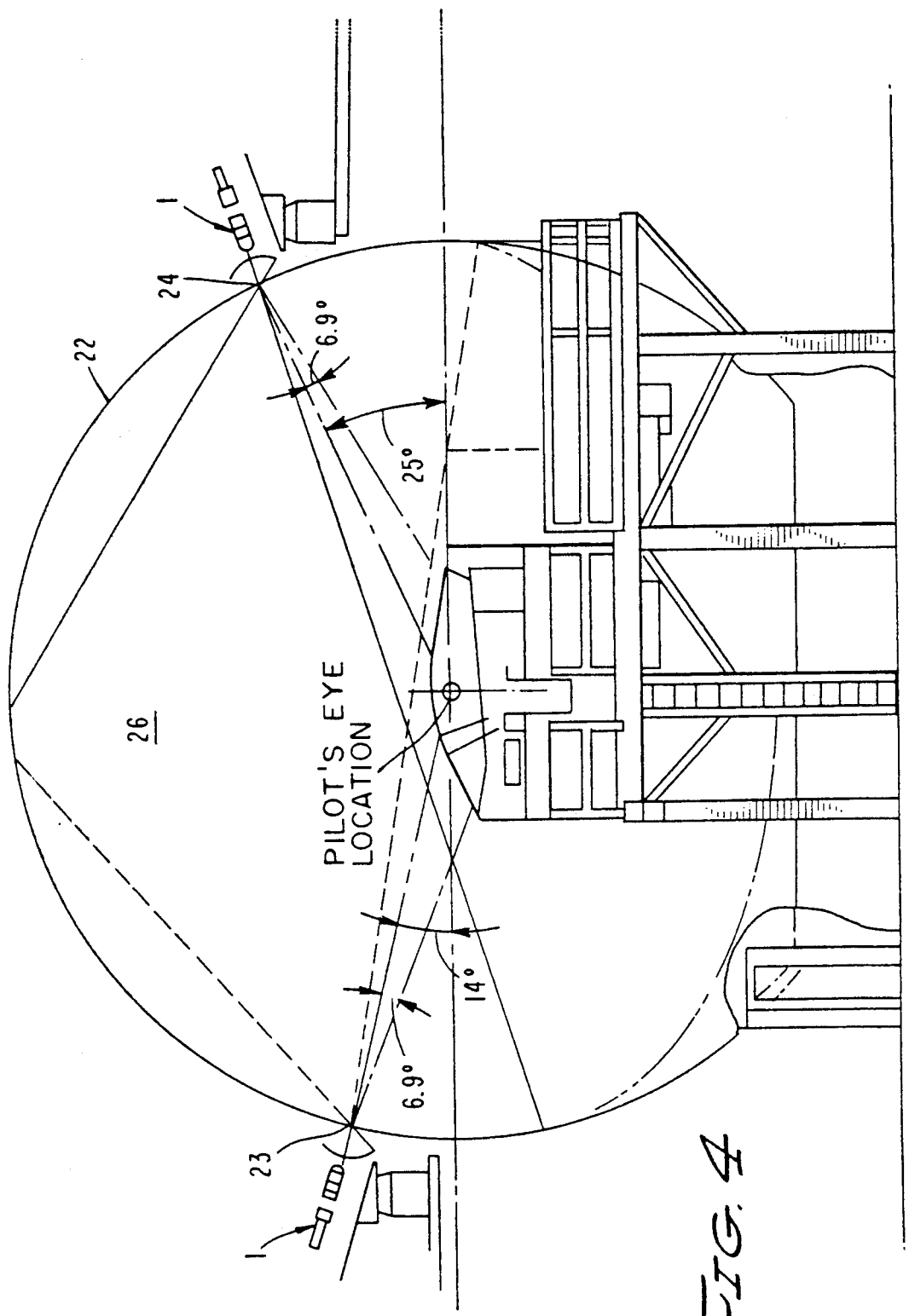
FIG. 4 shows, in schematic form, a flight simulator with two catadioptric projectors of the embodiment shown in FIGS. 1 and 2 positioned outside a flight simulator dome to project areas-of-interest displays on the inner surface of this dome.

FIGS. 1 and 2 show side elevation and top plan views of a preferred embodiment of catadioptric projector 1. Projector 1 includes an objective that contains elements 2 and 3, cemented doublets 4/5, single elements 7 and 8 and beam-combiner cube 6. The refractive relay portion of the projector includes cemented doublets 9/10, 11/12, 13/14, 15/16 and singlet lens 17.

Figure 6:
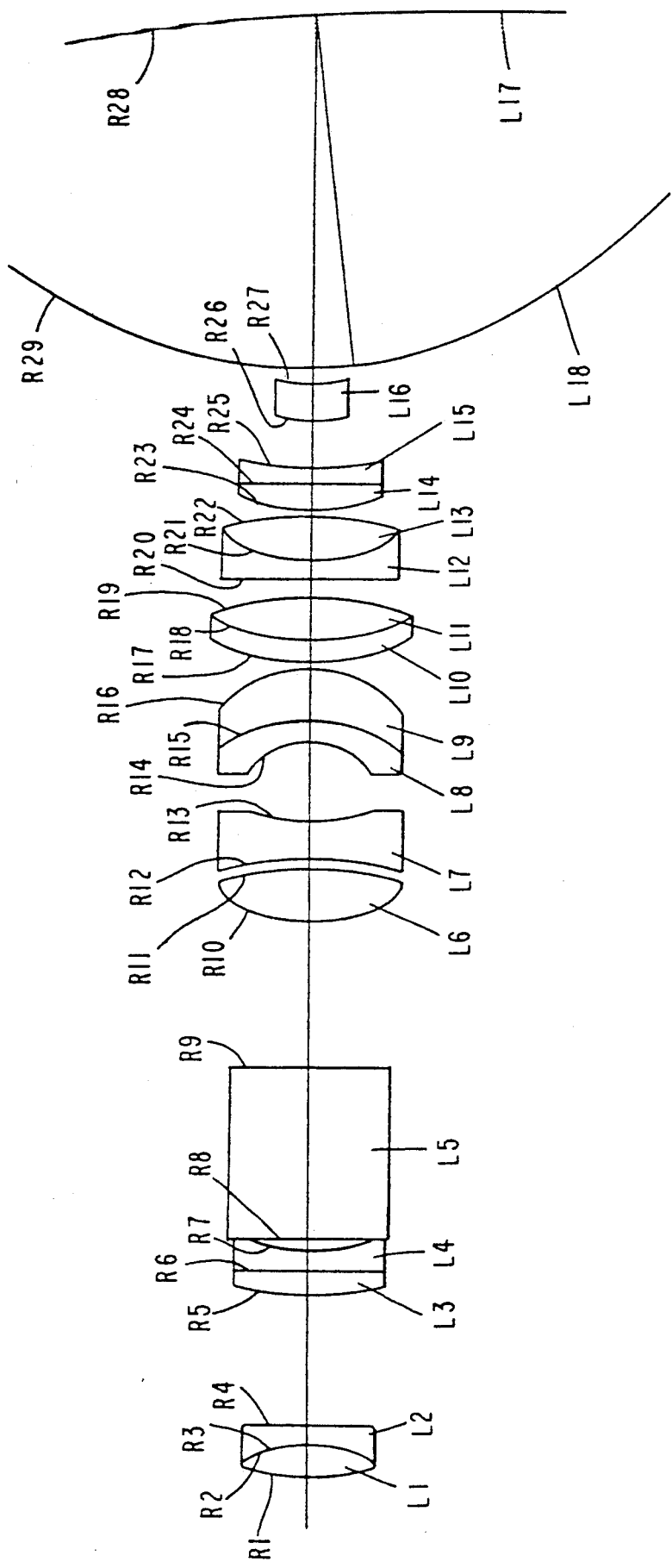
FIG. 6 shows a schematic of the projector embodiment depicted in FIGS. 1 and 2 with each of the lenses and mirrors, and the spacings between them, clearly depicted.

FIG. 6 and Table 1, respectively, provide a schematic of an optical prescription for the elements in the projector embodiment depicted in FIGS. 1-3 with each of the lenses and mirrors, and the spacings between them, clearly depicted. Table 1 identifies the radius (R) of each lens and mirror, the thickness (t) of each lens, the distance (S) separating each element from the next succeeding optical element, the index of refraction ($N_d$) of each optical element and the Abbe' value (Vd) of the glass from which the element is made in this preferred embodiment.

TABLE 1

| Lens | Radius | Thickness | Separation | Nd | Vd |
|---|---|---|---|---|---|
| I | R1 = 8.410 | t1 = 0.600 | | N1 = 1.586 | V1 = 61.04 |
|  | R2 = 3.800 | | S2 = 0.016 | | |
| II | R3 = −3.750 | t3 = 0.450 | | N3 = 1.613 | V3 = 44.30 |
|  | R4 = Infinity | | S4 = 2.838 | | |
| III | R5 = +7.3885 | t5 = 0.500 | | N5 = 1.607 | V5 = 56.65 |
| IV | R6 = Infinity | t6 = 0.520 | | N6 = 1.609 | V6 = 46.44 |
|  | R7 = 7.3885 | | S7 = 0.154 | | |
| V | R8 = Infinity | t8 = 3.800 | | N8 = 1.517 | V8 = 64.17 |
|  | R9 = Infinity | | S9 = 3.240 | | |
| VI | R10 = 3.404 | t10 = 1.115 | | N10 = 1.651 | V6 = 55.89 |
|  | R11 = −9.792 | | S11 = 0.203 | | |
| VII | R12 = −8.903 | t12 = .915 | | N12 = 1.648 | V12 = 33.85 |
|  | R13 = 6.200* | | S13 = 1.718 | | |
| VIII | R14 = −1.676 | t14 = 0.413 | | N14 = 1.626 | V14 = 35.70 |
| IX | R15 = −4.046 | t15 = 1.172 | | N15 = 1.603 | V15 = 60.60 |
|  | R16 = −2.712 | | S16 = 0.166 | | |
| X | R17 = 5.336 | t17 = 0.400 | | N17 = 1.762 | V17 = 26.53 |
| XI | R18 = 4.379 | t18 = 1.000 | | N18 = 1.603 | V15 = 60.60 |
|  | R19 = −6.758 | | S19 = 0.412 | | |
| XII | R20 = Infinity | t20 = 0.400 | | N20 = 1.689 | V20 = 31.18 |
| XIII | R21 = 3.404 | t21 = 0.950 | | N21 = 1.603 | V21 = 60.60 |
|  | R22 = −10.659 | | S22 = 0.162 | | |
| XIV | R23 = 3.999 | t23 = 0.613 | | N23 = 1.603 | V23 = 60.60 |
| XV | R24 = Infinity | t24 = 0.308 | | N24 = 1.689 | V24 = 31.18 |
|  | R25 = 7.718 | | S25 = 1.024 | | |
| XVI | R26 = 2.277 | t26 = 0.834 | | N26 = 1.589 | V26 = 61.27 |
|  | R27 = 3.483 | | S27 = 8.044 | | |
| XVII | R28 = −60.780 | | | Mirror | |
|  | | | S28 = −7.642 | | |
| XVIII | R29 = 10.796** | | | Mirror | |
|  | | | S29 = 7.642 | | |

*Conic constant = .88954
Aspheric deformation = .62215 × 10 − 2y4 − .20727 × 10 − 2y6 + .11064 × 10 − 2y8 − .10757 × 10 − 3y10
**Conic constant = −0.16392
Aspheric deformation = .25599 × 10 − 4y4 − .48920 × 10 −6y6 − .22970 × 10 − 8y8 + .50467 × 10 − 10y10

As shown in FIGS. 1 and 2, elements 2 through 17 form a rotationally symmetric, coaxial optical system along optical axis 36. Aspheric mirror 18 and spherical mirror 33 form a reflective pupil relay system for relaying the pupil imaged on opening 19 in aspheric mirror 18 to opening 20 in spherical mirror 33. Light rays passing through opening 19 strike surface 34 of spherical mirror 33, are reflected by that surface, then by surface 35 of aspheric mirror 18, and then pass through opening 20 in spherical mirror 33. All rays emerging from opening 20 are deviated upwardly at an angle of 6.9° with respect to optical axis 36 of projector 1 because spherical mirror 33 and aspherical mirror 18 are tilted by 3.45° and 6.9°, respectively, with respect to optical axis 36 in the y-z plane.

FIG. 3 shows, in block diagram form, catadioptric projector 1 with a plurality of image inputs to beam-combiner cube 6. Thus, light from source 42 travels on path 43 to relay telescope 44 and, from telescope 44, on path 45, to beam-combiner 6 through entrance pupil 21 and optical objective elements 2-5. The light from source 42 is directed by servo motor-driven, gimballed mirror 48 located at entrance pupil 21 into the optics of projector 1. Similarly, light from image source 40 travels along path 49 to relay telescope 50. Light emerging from relay telescope 50 on path 52 is directed by motor-driven, gimballed mirror 51 located at entrance pupil 21 of projector 1 into elements 2-5 of the projector, and then to beam-combiner 6 for combination with the light entering from path 45. The combined images are then directed along path 54 to refractive relay/mirror assembly 24, and, from there, along path 55 into opening 23 of dome 22. Inside dome 22, the image from source 42 is displayed on dome surface area 56 and the image from source 40 on dome surface area 57, simultaneously.

FIG. 4 shows, in schematic form, the use of two catadioptric projectors 1 with a flight simulator dome 22 with openings 23 and 24 on opposite sides of dome 22. Each of projectors 1 projects an area-of-interest display onto inner surface 26 of dome 22. One of the projectors provides a first field of view up to 112°; the other, a second field of view of up to 112°. Thus, the two projectors provide a total field of display on inner surface 26 covering substantially the entire field of view available to a person at the dome center.

Figure 5:
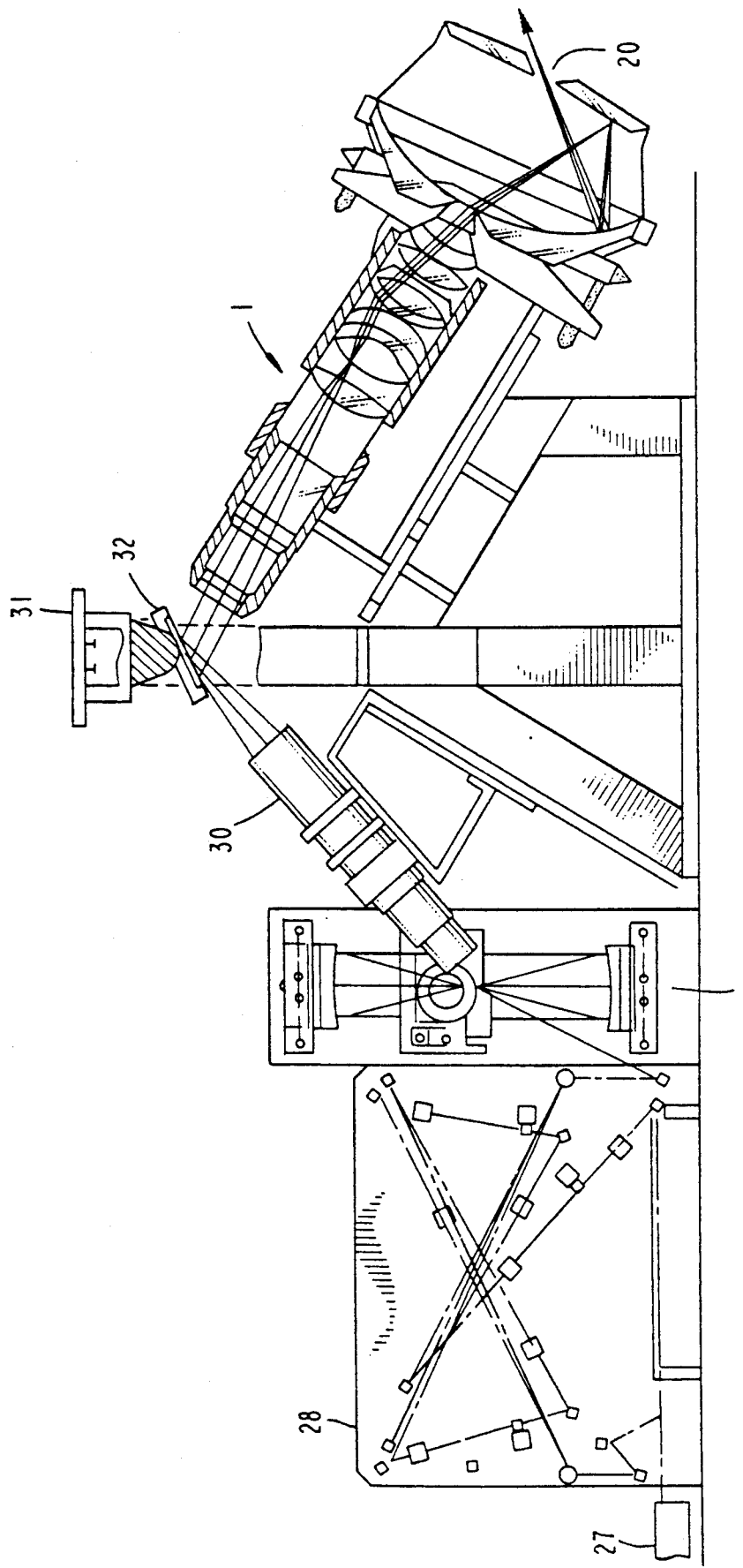
FIG. 5 shows, in schematic form, a system for generating image sources, for transmission into and through the projector embodiment shown in FIGS. 1 and 2, from an argon ion laser beam generator, a color modulation apparatus, a polygon-galvo assembly, a variable acuity telescope and a servo-driven gimballed steering mirror.

FIG. 5 shows an assembly for delivering the waist of argon ion laser beam 27 to the entrance pupil of projector 1. The argon ion laser beam from source 27 passes through color modulation assembly 28. Assembly 28 separates the beam into red, green and blue components, then directs these components into polygon-galvo assembly 29 which relays them to the input aperture of variable acuity telescope 30. Light rays emerging from variable acuity telescope 30 strike, and are reflected by the surface of the servo-driven gimballed positioning mirror 32, controlled by positioning motor 31 for input to projector 1. Light emerging from projector 1 through opening 20 is imaged on the inner surface of a flight simulator dome, such as dome 22 in FIG. 4.

Two-axis scan mirror 32 moves through angles of ±4.2° at the entrance pupil of projector 1, and is located 1.85 inches in front of the first surface of the objective in projector 1.

When projectors such as projector 1 are used for projection of areas-of-interest displays into a dome such as dome 22 (see FIG. 4), the deviated axial beams from the two projectors are pointed at the center of the dome. Thus, in FIG. 4, one projector beam is angled by 14° downwardly from the dome's centerline; the other projector, by 25°. A viewer seated at the center of the dome and looking at the exit pupil of either projector sees only a dark spot formed by the light trap on the surface of aspheric mirror surface 33, while the bright hole formed by rays entering the projector along the optical axis of the refractive elements and passing straight through openings 19 and 20 in the mirrors (FIG. 4) are directed 6.9° below the viewer's line of sight.

EXAMPLE

A catadioptric projector, as shown in FIGS. 1 and 2, has been built and tested using a raster-scanned, laser input image source and a two-axis, stepper-motor-controlled steering mirror.

To generate the displayed image, a laser beam was focused into an acousto-optic modulator, which receives video signals from the video controller. The beam was subsequently intensity-modulated and then directed into an x-y deflection system, thus creating a complete video raster image. This image entered the relay telescope, which collimated it onto the servo-controlled/gimballed mirror. The magnification of the relay telescope was designed to produce a 5° raster as output from the catadioptric area-of-interest projector. The mirror controls the input angle of the collimated raster into the catadioptic area-of-interest projector, such that the 5° raster could be positioned anywhere within the total hemispherical field of regard of the catadioptric area-of-interest projector.

Measurements were taken of resolution of the projected image, both on-axis, and at the edge of the field of view, by positioning the displayed image with the stepper motors. In this test, we also measured the catadioptric area-of-interest display field of view and the exit pupil size. The results obtained appear in Table 2 below.

TABLE 2

| Parameter | Design Goal | Measured Performance |
|---|---|---|
| Resolution (TV limiting): | | |
| ON-AXIS | 1 arc minute | .75 arc minute |
| +56° | 1 arc minute | 1 arc minute |
| Field of View | ±56° circular | ±56° circular |
| Exit Pupil Diameter | .5 inch | .4 inch |

These results indicate that the projector of this invention achieves better than one arc minute per line resolution over a field of view of ±56° (i.e., 112°) and that the exit pupil diameter is desirably smaller than the design goal.

What is claimed is:

1. A catadioptric projector for producing areas-of-interest displays having resolution of substantially less than 10 arc minutes per line and including: entrance pupil means for receiving beams of substantially collimated light; means for imaging said entrance pupil means onto an opening in the surface of aspheric mirror means, said means for imaging being linked to said entrance pupil means; aspheric mirror means linked to said means for imaging and including an opening for transmitting light received from said means for imaging; and spherical mirror means having an opening for receiving and for transmitting light from said aspheric mirror means.

2. The projector of claim 1 further comprising means for combining a plurality of image sources for transmission through said projector.

3. The projector of claim 2 wherein said combining means comprises a beam-combiner within said projector.

4. The projector of claim 1 or claim 2 wherein said means for imaging comprises an optical objective linked to said entrance pupil, and a refractive relay linked to said optical objective.

5. The projector of claim 4 wherein said optical objective and said refractive relay form a rotationally symmetric coaxial system, and wherein said aspheric and spherical mirrors are tilted to deviate the line of sight from the optical axis of the projector sufficiently to cause light emerging from said projector to be deflected from the optical axis of the system sufficiently so that a viewer looking directly at the opening in the spherical mirror cannot see light passing through said opening.

6. A catadioptric area-of interest display projector system including means for steering collimated light into a catadioptric projector, and a catadioptric projector comprising: means for producing displays having resolution of substantially less than 10 arc minutes per line and including an external entrance pupil as means for receiving beams of substantially collimated light; means for imaging said entrance pupil onto an opening in the surface of an aspheric mirror, said means for imaging being linked to said entrance pupil; means for imaging the opening in the aspheric mirror onto an opening in a spherical mirror, said aspheric mirror being linked to the means for imaging and said spherical mirror being linked to the aspheric mirror; and with said projector and said steering means being positioned outside a dome forming part of a flight simulator system, said projector being designed to project a field of view of at least ±56° on a surface inside of said dome.

7. The projector of claim 6 wherein said steering means is a servo-driven, gimballed mirror located at the entrance pupil having sufficient freedom of rotation to steer area-of-interest images from a varying field of view into said projector in response to signals generated by the head and eye movements of a person viewing the images emerging from the projector, or by signals generated from sources independent of a person viewing the images emerging from the projector.

8. The projector of claim 7 further comprising means for delivering a plurality of image sources to said projector, and means for steering collimated light from the entrance pupil into said projector, in response to signals generated by head and eye movements of a person viewing the images emerging from the projector, or by signals generated from sources independent of a person viewing the images emerging from the projector.

9. The projector of claim 1 wherein said projector has a circular output field of view of at least ±56°, and a resolution over said field of view of about one arc minute per line.

10. A method for projecting at least one image source onto the inner surface of a dome with a resolution of less than 10 arc minutes per line resolution over a field of view of at least ±56° comprising: directing collimated light into the entrance pupil of a projector; imaging said entrance pupil onto the opening in an aspheric mirror; imaging the pupil at said aspheric mirror opening onto the opening in the surface of spherical mirror means; and imaging light emerging from the opening in said spherical mirror, which is located on the periphery of a dome onto the curved inner dome surface.

* * * * *